(12) United States Patent
Gaskill et al.

(10) Patent No.: US 6,985,456 B2
(45) Date of Patent: Jan. 10, 2006

(54) METHOD TO REDUCE INTERFERENCE AND INCREASE EFFECTIVE CAPACITY OF POWER LINE NETWORKING SYSTEMS

(75) Inventors: Garold Bruce Gaskill, Tualatin, OR (US); Sherman Leon Gavette, Camas, WA (US); Carl Mansfield, Camas, WA (US)

(73) Assignee: Sharp Laboratories Of America, Inc., Camas, WA (US)

(*) Notice: Subject to any disclaimer, the term of this patent is extended or adjusted under 35 U.S.C. 154(b) by 1017 days.

(21) Appl. No.: 09/792,136

(22) Filed: Feb. 22, 2001

(65) Prior Publication Data

US 2002/0054577 A1 May 9, 2002

Related U.S. Application Data

(60) Provisional application No. 60/232,438, filed on Sep. 12, 2000.

(51) Int. Cl.
*H04B 7/185* (2006.01)
*H04B 1/04* (2006.01)
*H04B 1/38* (2006.01)

(52) U.S. Cl. .................... 370/318; 370/230; 370/235; 455/13.4; 455/127.1; 455/572

(58) Field of Classification Search ................ 340/310.01–310.08, 825, 7.37, 7.29; 455/570–574, 455/13.4, 127.1; 370/468, 311, 229–238, 370/318–317; 375/257–259
See application file for complete search history.

(56) References Cited

U.S. PATENT DOCUMENTS

| 4,025,853 | A | | 5/1977 | Addeo |
| 5,003,619 | A | | 3/1991 | Morris et al. |
| 5,566,165 | A | | 10/1996 | Sawahashi et al. |
| 5,623,486 | A | * | 4/1997 | Dohi et al. ................. 370/342 |
| 5,768,684 | A | * | 6/1998 | Grubb et al. .............. 455/13.4 |
| 5,787,352 | A | | 7/1998 | Benveniste |
| 5,987,333 | A | | 11/1999 | Sole |
| 6,643,272 | B1 | * | 11/2003 | Moon et al. ................ 370/311 |
| 2002/0010870 | A1 | * | 1/2002 | Gardner ...................... 713/300 |
| 2002/0065094 | A1 | * | 5/2002 | Schmutz et al. ........... 455/522 |
| 2002/0105925 | A1 | * | 8/2002 | Shoemake .................. 370/330 |
| 2002/0123357 | A1 | * | 9/2002 | Abrishamkar et al. ...... 455/458 |
| 2003/0184433 | A1 | * | 10/2003 | Zalitzky et al. ........ 340/310.06 |
| 2003/0193907 | A1 | * | 10/2003 | Rezaiifar et al. ........... 370/329 |

* cited by examiner

*Primary Examiner*—Dang Ton
*Assistant Examiner*—Melanie Jagannathan
(74) *Attorney, Agent, or Firm*—Robert D. Varitz, PC

(57) ABSTRACT

A method of power control for use in a communications network having plural transceiver communications nodes therein, including, in an initiator node, transmitting a first signal at a first power level to a responder node; in the responder node, measuring and storing, a first signal level for the first signal and a first signal responder noise level; determining responder reception characteristic information; and sending a second signal to the initiator node; in the initiator node, measuring and storing, the second signal signal level and second signal initiator noise level; and sending a third signal to the responder node; in both the initiator node and the responder node, determining a subsequent data transmit signal power and data rate; and transmitting data at the subsequent data transmit signal power and data rate.

26 Claims, 4 Drawing Sheets

METHOD TO REDUCE INTERFERENCE AND INCREASE EFFECTIVE CAPACITY OF POWER LINE NETWORKING SYSTEMS

This application claims benefit of a provisional application No. 60/232,438 filed on Sep. 12, 2000.

FIELD OF THE INVENTION

This invention relates to the field of network communication systems, including systems operating on wired media, such as power lines and phone lines, and specifically relates to reducing interference through effective use of power control.

BACKGROUND OF THE INVENTION

Methods to reduce interference between neighboring networks, which share media, in existing wired systems, are limited. In AC power line systems. the physical lines are not dedicated to a single network. The AC power line network, i.e., the physical network, includes all outlets on a low voltage side of a residential or business transformer. As from four to one-hundred or more residential units may be connected to a single transformer, the physical access points, i.e., the outlets, of a power line network include many dwelling units, houses, apartments, etc. Thus, a desired logical network, typically in a single residence, generally occupies only a small portion of the physical network, the primary purpose of which is to provide AC power to the residences connected thereto. In addition, an AC power line system does not provide any shielding to reduce radiated RF emissions, or to prevent interference from radiated RF emissions, as the network configuration and topology are neither controlled nor designed for communications. Thus power line systems, though physically wired, are quite different from typical wired or dedicated line networks.

Because the physical access points, or nodes, are not isolated to a single logical network, power line networks have more similarity to wireless systems than to wired networks. As in a wireless system, a receiver may hear and receive: 1) the transmission from the intended system; or 2) the transmissions from an unintended, logically different system, e.g., a neighbor; or 3) transmissions from both the intended and unintended systems.

Once a desired network has been defined, regardless of whether it is a wired network or a wireless network, the issue of contention for access to the media needs to be resolved. To resolve the problem of contention for the media, some systems, including some power line systems, use a carrier sense multiple access/collision avoidance (CSMA/CA) method, which is an uncoordinated form of time-multiplexing, which does not use specifically assigned time slots, and which is designed to share capacity on a single physical medium. In lightly loaded systems, CSMA/CA is an effective method to share capacity, however, as system load increases, the capacity available for each node is reduced by the presence of the other nodes contending for the same frequencies, time and general location.

For CSMA/CA systems under heavy load, i.e., when there is contention for capacity, the total utilization may be lower than 60%. Systems utilizing token passing may increase the utilization up to approximately 80%, but, because the overhead for token passing is significant when transmitting small packets token passing may result in lesser utilization of the capacity than in CSMA/CA systems, particularly in networks having a large number of nodes.

In addition to poor utilization, there are Quality Of Service (QoS) problems created as a result of the contention for the media, including increased packet delivery delay and increased variability in packet arrival times, also known as "jitter." The collision and collision back-off mechanism of CSMA/CA results in reduced utilization, increased delay and increased jitter. Other capacity enhancement techniques are known in the prior art:

Wireless Systems: Cellular

There are wireless systems in the prior art, e.g., code division multiple access (CDMA) mobile phone systems, designed to improve the signal-to-noise and interference ratio (SNIR) of each and every link by reducing power of the links between the mobile transceivers and a base station. In mobile phone systems, the power is controlled by a base station that monitors and controls the power of each mobile device. The base station also "knows" the network topography, i.e., the base station knows that it is at the center of its own cell, or sub-net.

Wireless Systems: Ad hoc Networks

The IEEE 802.11 (Wireless LAN) standard does not establish power control criteria except as a means of statically limiting the transmit power of a device to the maximum power output permitted by the applicable regulatory bodies.

The Bluetooth™ standard implements an optional power control criterion which is used by a receiver to request that a transmitter increase or decrease its transmit power to conform with the receiver's "golden receive power," which is not specified beyond being a received signal strength intensity (RSSI) range of at least 20 dBm and being the "preferred" power of the device. While this optional power control may have an unintended side effect of helping to reduce overall network interference and thereby increase system capacity, the Bluetooth™ power control criteria does not directly address these goals: if a device's preferred power is too high, The Bluetooth™ technique actively works against reduced interference/increased capacity.

Wired Systems: Dedicated Networks

In a typical wired or dedicated line network or system, such as Ethernet, all nodes may reliably receive any transmission because the dedicated lines of the system are designed to conduct the signal and the network configuration and topology may be controlled. Also, because dedicated line networks include methods of shielding the line to reduce radiated emissions, such networks transmit at sufficient power to permit all nodes in the network topology to reliably receive the signal from any transmitting node. Multiple networks are easily isolated from each other. If communication between networks is required, a "bridge" may be made between specific networks, which bridge may limit the communication to those times when cross network communication is desired.

Wired Systems: Power Line

Because power line networks are relatively noisy, and because power line networks do not have controlled and consistent impedances, most power line systems maintain a power level as high as possible in order to maintain the highest data rate and the highest reliability.

Wired Systems: Other

Home Phone Networking Alliance (HomePNA) and other wired systems are being implemented, however, it is not known whether such systems address the power control issues resolved herein.

Power control methods are used to increase capacity in existing cellular wireless systems and to optimize reception in ad hoc wireless networks; however, power controls methods are not known to be used in wired systems. Dedicated-wired systems do not require power control or other capacity increasing methods because the dedicated wired system is isolated from other wired systems. Power line systems must share the same conductors as neighboring structures supplied by the same transformer, therefore, methods to isolate neighboring systems must be developed and implemented.

U.S. Pat. No. 5,987,333 to Sole, granted Nov. 16, 1999, for Communications power control, describes a power control technique for CDMA systems, base stations and mobile units. The approach to power control is iterative and based on received SNIR. The purpose of such power control is to reduce interfering signal levels, which is advantageous to CDMA systems.

U.S. Pat. No. 5,787,352 to Benveniste, granted Jul. 28, 1998, for System and method for management of neighbor-channel interference with power control and directed channel assignment, describes techniques to assign frequencies and control power of receivers on adjacent channels to minimize interference on the desired channel. It requires that a base station be in control of the channel assignment and power control.

U.S. Pat. No. 5,566,165 to Sawahashi, et. al., granted Oct. 15, 1996, for Transmission power control method and a communication system using the same, describes a CDMA system, having a base station and mobile units. Power control bits based on the received SIR, independent of system load or need, are periodically sent by the base station to a mobile unit, which reduces its transmit power accordingly. This manner of power control is useful in a CDMA system to reduce interference to other mobile units on the same frequencies.

U.S. Pat. No. 5,003,619 to Morris, et. al, granted Mar. 26, 1991, for Method and apparatus for adjusting the power of a transmitter, describes a system wherein peer-to-peer power control is used. The method includes sending codes to the transmitter from the receiver representing the RSSI, but does not send the RSSI itself or the noise or interference level. The purpose of the exchange is to reduce transmit power to increase battery life, not to permit operation of other units in the surrounding area on the same frequency.

U.S. Pat. No. 4,025,853 to Addeo, granted May 24, 1977, for Method and apparatus for radio system cochannel interference suppression, describes a system which requires that each base station provide a different tone, modulated on the same frequency, and that a receiver send the tone of the desired base station. There are no power control methods described to reduce co-channel interference.

In light of the foregoing, there is a clear need to improve the capacity, utilization and quality of service of power line networks when multiple systems share the same physical network.

SUMMARY OF THE INVENTION

A method of power control for use in a communications network having plural transceiver communications nodes therein, including, in an initiator node, transmitting a first signal at a first power level to a responder node; in the responder node, measuring and storing, a first signal level for the first signal and a first signal responder noise level; determining responder reception characteristic information; and sending a second signal to the initiator node; in the initiator node, measuring and storing, the second signal level and second signal initiator noise level; and sending a third signal to the responder node; in both the initiator node and the responder node, determining a subsequent data transmit signal power and data rate; and transmitting data at the subsequent data transmit signal power and data rate.

An object of the invention is to provide a method of increasing the effective capacity and to improve the quality of service by adjusting the power of transmissions in a power line-based communication system.

Another object of the invention is to provide a method of automatically reducing transmission power upon detection of predetermined criteria on a network.

A further object of the invention is to reduce the emission of unintentional RF radiation.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

A method, and several variations thereof, of reducing interference and increasing the effective capacity of network systems operating on shared wire under heavy load situations are described herein. The method described herein may also be applicable to ad hoc wireless networks. While the range control method described herein is described as operating on node pairs, the techniques may easily be extended to cover applications which involve more than two nodes, i.e., where some of the transmissions are multicasts. As long as there is only one power line network on any given transformer, the problem of network overlap on the physical system does not exist, and carrier contention problems are lessened. In such a situation, the power of the transmitter may be maximized—limited only by the regulations regarding unintended conducted and radiated emissions. When, however, there is contention for the network media, performance gains are possible by transmitting at power levels that are just sufficient for reliable communications, and not more. By reducing power, a power line network may reduce or eliminate the interference between two or more logical networks on the same physical network, thus avoiding collisions and permitting higher capacity for all of the systems on the physical network.

Power control in this invention may be instigated automatically or by high loads and/or collisions. The purpose of the method of the invention is to increase RF separation of communicating pairs, thus allowing simultaneous operation on the same frequencies. This method is referred to herein as space division multiple access (SDMA), and uses methods not used in CDMA applications. CDMA systems share frequencies simultaneously. The SDMA of the invention provides physical separation of identical frequency sources.

Figure 1:
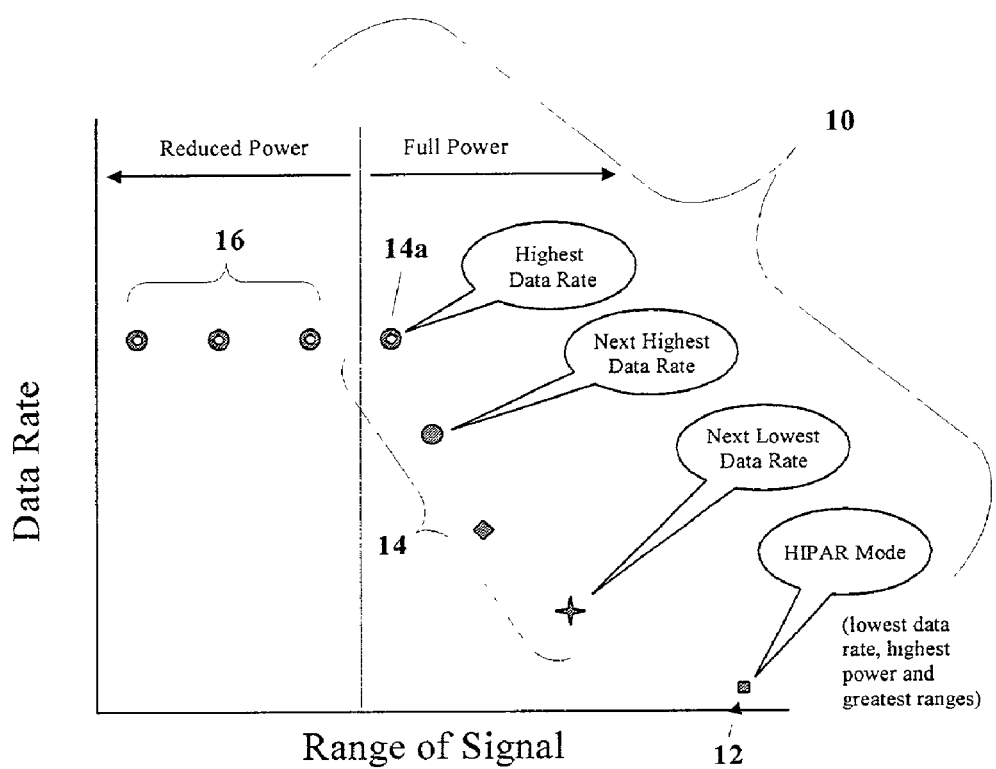
FIG. 1 depicts the operating points of a power line system which has range control via power control and data rate control.

Referring now to FIG. 1, the operating points of a power line system, which has range control via power control and data rate control, are depicted generally at 10. In some practical consumer circumstances, power line communications systems display degraded capacity and degraded quality of service which reduce the value of the system. These circumstances may occur when two or more logical networks operate simultaneously on a single physical power line network, or when more than two nodes within a single logical network wish to communicate simultaneously.

To initiate a link between two nodes on the network, a greatest range, highest power, lowest data rate (HIPAR) mode is used. HIPAR mode reduces the chance of hidden nodes and allows all receivers to hear the transmission. A hidden node is a node that cannot hear a transmission from at least one other node in the network. Hidden nodes create problems because the cause transmission collisions, transmitting when another node is also transmitting, because the hidden node does not hear the transmission of the other node. The HIPAR operating point is located at 12 in FIG. 1. After determining the appropriate power and data rate from information exchanged with its intended receiver(s), the transmitter selects the optimal operating point from the points in FIG. 1. There are cases which require full transmit power to obtain desired data rate/reliability performance. In these cases, power reduction 14 cannot be used. In other cases, there is a sufficient signal-to-noise ratio to permit the use of the maximum data rate, 14a. In these cases, power control may be applied to increase the effective capacity of the physical network. These points are indicated generally at 16.

In power line systems, unlike mobile phone systems, there is typically no base station or central controller—there is only an ad hoc peer-to-peer network, however, none of the peers "know" the topography of the system. This lack of central control imposes the responsibility to adjust transmit power on each individual node relative to each other node it communicates with, with some support in the form of information exchanges from the other nodes, operating without knowledge of the topography of the system, i.e., any given node does not know whether it is near the boundary or the center of the system. Power control is thus based, not on the action of a base station communicating with mobile units, but on ad hoc peer-to-peer mutual coordination. As in all power-controlled systems, power control by a single device, or communicating set of devices, does not provide immediate benefit. The benefit occurs when all devices operating on the network reduce their power, thereby creating a more amicable environment for all of the devices. Each device that fails to cooperate degrades the advantages of power control.

Power control methods work not only to increase the capacity of multiple overlapping logical networks, but may also work to increase capacity within a single logical network when there is contention for media capacity between differing applications. This advantage occurs when one communication pair is physically separate from other communication pairs, as shown in FIG. 2.

Adaptive Power Control

Adaptive power control is a method used to improve performance of power line networks by isolating communicating node pairs from other communicating node pairs. This is achieved by reducing the transmitting power of one or both communicating node pairs. If there is little or no traffic on the network, the nodes transmit at the maximum allowable power. When the network becomes crowded, adaptive power control reduces power to allow other nodes to use the network. The nodes are typically transceiver communication nodes. As previously noted, the method of the invention may also be used with an ad-hoc wireless network and multicast or broadcast nodes. The power control temporarily isolates sub-systems, thereby increasing aggregate system capacity. Three techniques for invoking the adaptive power control method of the invention are described. The three techniques include automatic power control, collision sense power control and requested power control.

Figure 2:
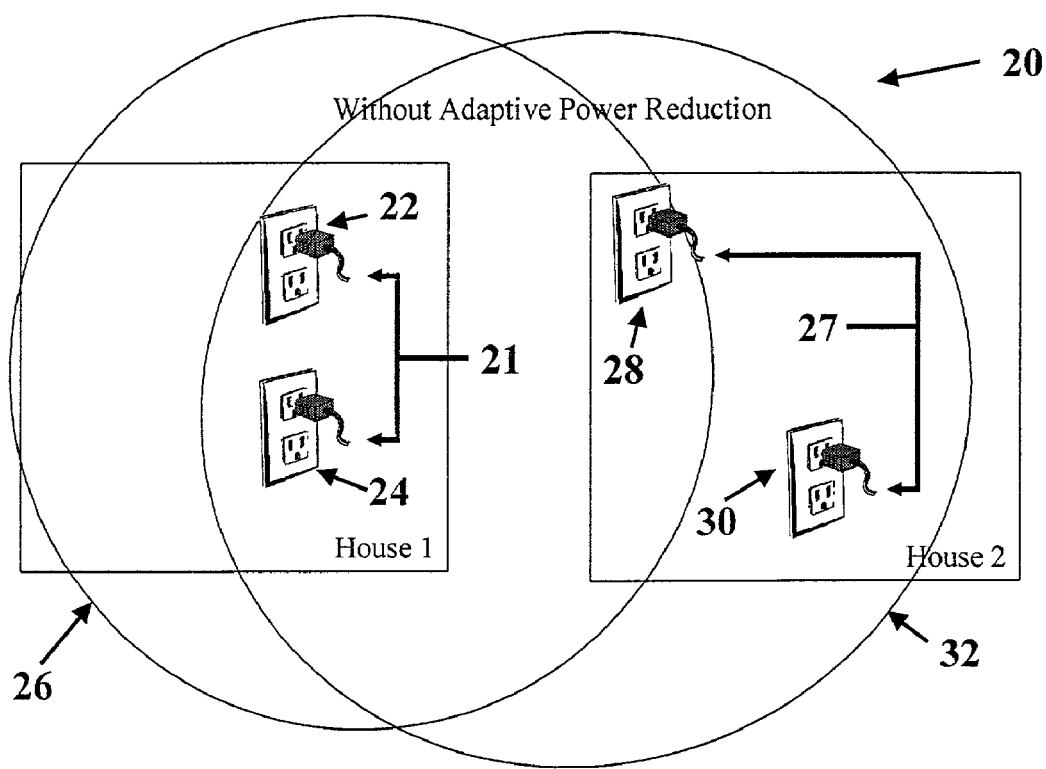
FIG. 2 depicts a power line network in a residential setting.

Referring now to FIG. 2, a power line network is depicted generally at 20. Network 20 includes two houses: House 1 and House 2. House 1 includes a wiring system 21, having outlets 22, 24, and a logical network 26. House 2 includes a wiring system 27, outlets 28, 30 and a logical network 32. To implement power control according to the method of the invention, each node is required to maintain a collection of network information that it gathers from information supplied by other nodes. Because network characteristics may be constantly changing, it is necessary to dynamically maintain this information and to control transmission power automatically. The minimum information maintained by each transmitter, referred to herein as network information, on each potential receiver is:

TABLE 1

| Transmitter Information Maintained on each Receiver | Type of Information | Abbreviation |
| --- | --- | --- |
| Data_Transmit_Signal_Power | Exponentially weighted mean value in dBm | D_TSP |
| HIPAR_Transmit_Signal_Power | Exponentially weighted mean value in dBm | HIPAR_TSP |

For example, if a node has "heard" no activity from any transmitter for a long time, then the power level used when transmitting may be increased to the maximum permitted, to ensure reliability and with little risk of collisions. On a network having a great deal of activity, a particular node may, based on its previously stored network information from other nodes, decide to transmit at the lowest power possible to increase the chance of clear communication for other receivers on the network. Thus, the method of the invention is adaptive to the network environment at any given instance.

Figure 3:
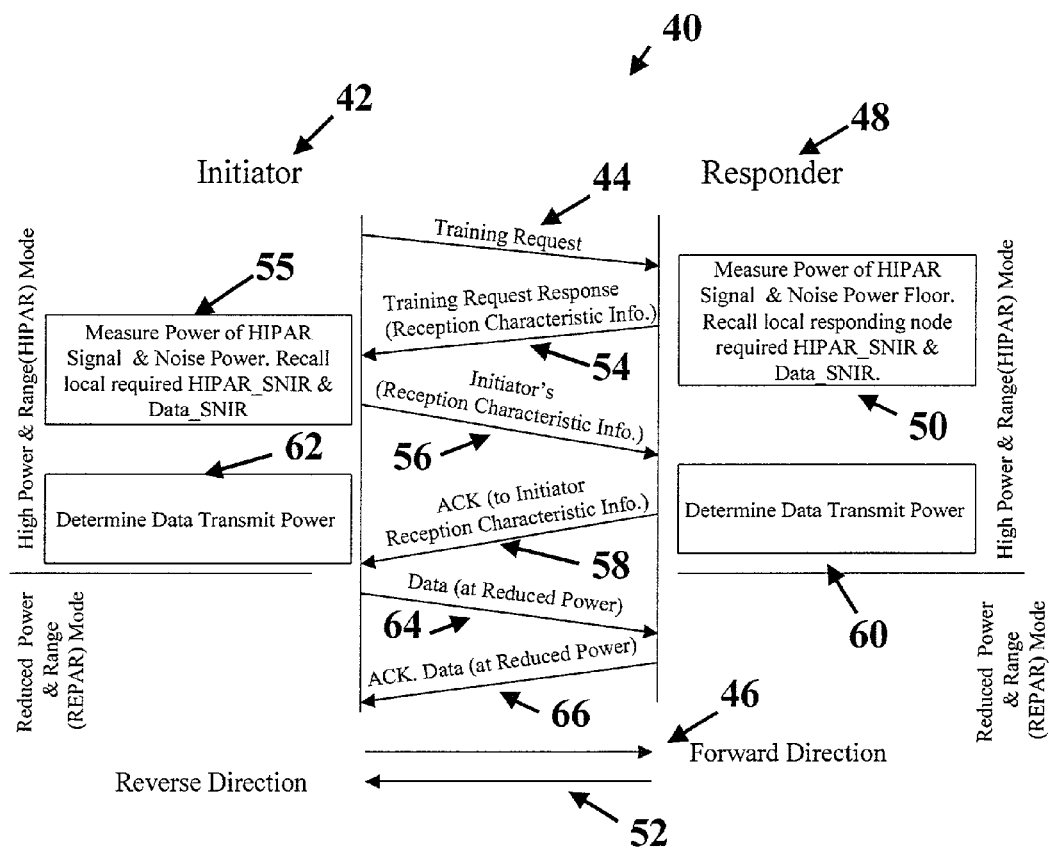
FIG. 3 depicts the adaptive power control method of the invention.

The adaptive power control method of the invention, shown generally at 40 in FIG. 3, may be implemented as follows: A node, wishing to establish a link and simultaneously to implement power control, assumes the role of "initiator" 42 and sends an initial Training Request Command (TRC) 44, a first signal, on a "forward path," 46 at the highest transmit power, the first power level, and highest reliability (HIPAR) mode to the desired receiving node.

A receiving node, or responder, 48 measures and records, or stores, the Received_HIPAR_Signal_Level and the Responder_Noise_Level 50 associated with the reception of TRC 44. Responder 48 sends, in a "reverse path" 52, a Training Request Response (TRR) message 54, a second signal, in HIPAR mode, which contains Responder Reception Characteristic Information (RRCI) 55, including, at a minimum:
1. HIPAR_Transmit_Signal_Power—transmit power being used for this transmission;
2. Data_Transmit_Signal_Power—transmit power being used for data transmission, which should be the exponentially weighted mean of the Data_Transmit_Signal_Powers which were successfully used in previous data communications on this link. If there has been no data transmissions on this link in any mode other than HIPAR, this value is set to As each communicating node pair or link reduces power to the minimum required to maintain communication, the Data_Transmit_Signal_Power levels used are constantly changing. Nodes generally attempt to reduce power, except when a large number of communication errors occur. Communication errors are often indicated by transmissions that are not acknowledged, suggesting insufficient transmit power, or media contention from a hidden node, or other interference. When large numbers of communication errors occur, the transmitter may initiate a new TRC, or simply increase power temporarily until success is achieved. Because the TRC uses HIPAR mode, it could easily interfere with another link currently operating at reduced power. For this reason, transmissions and receptions using HIPAR mode are ignored when estimating collisions and calculating average transmit power, because these messages are designed to cover as much of the physical network as possible and power control is intended to restrict coverage of the physical network. It is possible that an increase in power in one link

---

HIPAR_Transmit_Signal_Power;
3. Received_HIPAR_Signal_Level;
4. Responder_Noise_Level (which is measured during quiet time close to the TRC);
5. Required_Responder_HIPAR_SNIR; and
6. Required_Responder_Data_Signal_SNIR.

---

Initiator 42, upon reception and interpretation of TRR message 54, determines whether it is able to reduce the Data_Transmit_Signal_Power for future data communications with the responder. This reduction in Data_Transmit_Signal_Power reduces the range of transmission, and hence the interference with other links in the network.

Because, in power line systems, reverse path 52 is not likely to have the same characteristics as forward path 46, it is necessary that initiator 42 send its Initiator Reception Characteristic Information (IRCI) 56, a third signal, also in HIPAR mode, which it obtained during reception of RRCI 55 from responder 48.

may force other links to raise their power. It is thus important to keep some hysteresis in the network and stability in the transmit power levels to minimize the number of training requests issued. Otherwise the requests may offset the gains made by initial power reduction.

When a node senses that collisions with other transmissions are occurring, they are handled by back-off delay, such as commonly found in CSMA/CD systems. The information obtained in TRRs may be used by a receiving node to calculate the Data_Transmit_Signal_Power required to communicate with the node which sent the TRR data.

Figure 4:
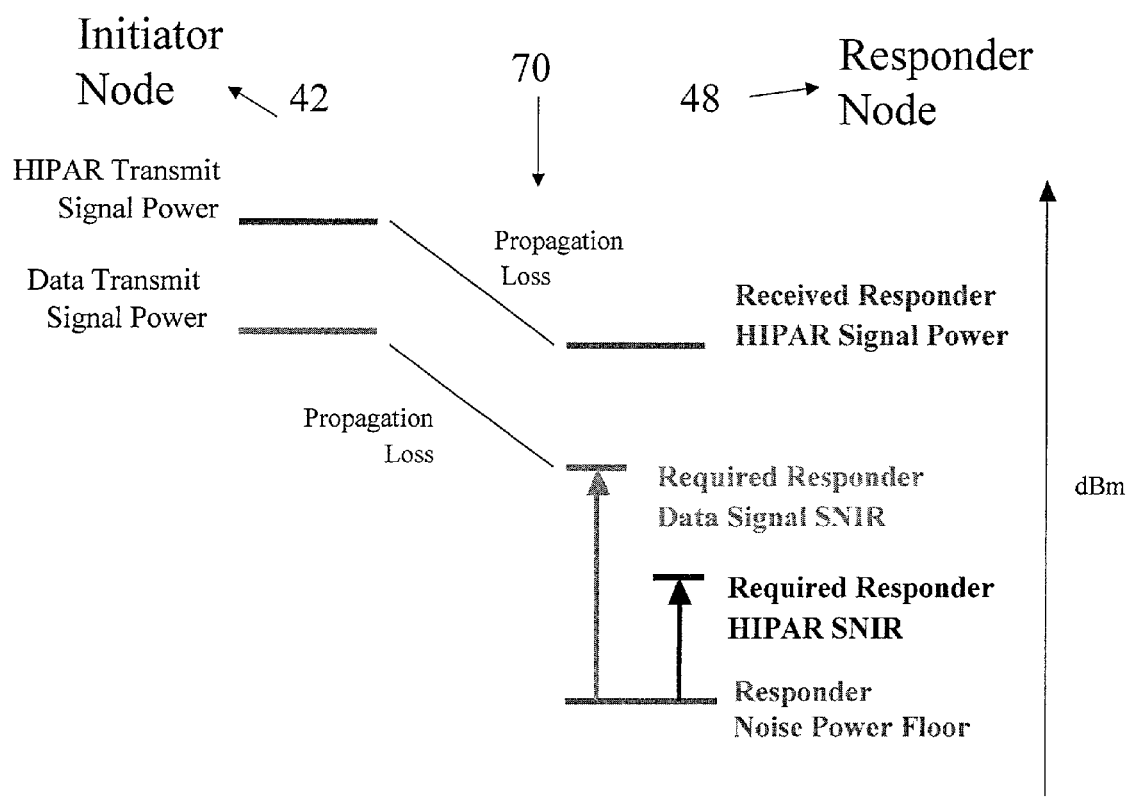
FIG. 4 depicts a method of the invention for calculating a data transmit signal power value.

The Data_Transmit_Signal_Power may be calculated in dBm, as shown in FIG. 4, generally at 70. Mathematically:

---

Data_Transmit_Signal_Power = Required_Responder_Data_Signal_SNIR
 + Propagation_Loss
 + Responder_Noise_Power
Where
Propagation_Loss = .HIPAR_Transmit_Signal_Power
 − Received_HIPAR_Signal_Power

---

Responder 48 acknowledges receipt of IRCI 56. IRCI 56 may then be used by responder 48 when it is acting as a transmitter. IRCI 56 is used by responder 48 to determine data transmit power 60 for the reverse direction, while initiator 42 uses RRCI 55 to determine data transmit power in the forward direction. Following this exchange of IRCI and RRCI, and determination of the forward and reverse data transmit powers, initiator 42 and responder 48 begin transmitting data at the newly calculated Data_Transmit_Signal_Powers, 64, 66, respectively, and data rates, which are likely different for each device, and which are designed to minimize the potential interference to other nodes while maintaining reliable data communication between the linked nodes.

Alternatively, a device may obtain the information required to perform power control by storing exponentially weighted mean power levels, i.e., the greatest weight is assigned to the most recent data, for both successful and unsuccessful communications. Thus by observing successes and failures, the transmitter power required may be estimated from the stored exponentially weighted mean power levels.

Automatic Power Control

The automatic power control feature of the invention provides a means of invoking the adaptive power control feature of the invention without any outside stimulus. As soon as a node pair, or set, establishes a link, they both, or all, invoke adaptive power control. This has the advantage of always reducing power, and therefore reducing noise, to the lowest possible level. Thus, it minimizes its interference not only with other networks of the same type, but also with foreign devices, i.e., other technologies, such as CEBus, that do not communicate with devices on the network. This has the advantage that it always minimizes interference of the link with all other users of the physical network. This variation has the disadvantage that it doesn't consider the need for reduced power based on external factors, so it may needlessly compromise the reliability of the link when it is unnecessary to do so.

Collision Sense Power Control

The collision sense power control (CSPC) feature of the invention initiates adaptive power control as a function of the number of collisions which occur when contenting for a channel. In a CSMA/CA system, when a device "collides" with another device, it initiates a random back-off, essentially withdrawing itself from competition for a period of time. Under CSPC, when a device senses a number of collisions above a given threshold, it invokes adaptive power control after it seizes the channel. This feature has the advantage of reducing interference and increasing capacity only at those times it is most needed and keeping the highest link reliability at other times.

Requested Power Control

In the requested power control (RPC) feature of the invention, a node pair transmits at full power until one or more of them receives a Reduce_Power_Request from another node. When a Reduce_Power_Request is received, the requested nodes will invoke adaptive power control, with all nodes with which it communicates. Note that only those nodes which are requested to reduce power invoke adaptive power control. There are several techniques for requesting power control, including having each transmitter periodically poll for competitors, which is analogous to the transmitter asking: "Am I bothering anyone?". Alternatively, any station sensing collisions and being forced to back-off could, when it is able to seize the channel, and following CSMA/CA rules, transmit a message to the competing node(s) requesting power reduction, which is analogous to the transmitter stating: "You are bothering me."

RPC allows the requested nodes to either reduce power as much as possible, or reduce power just enough to preclude further interference. This technique has the advantages that: (1) it allows a network that is operating alone to utilize full power to insure maximum data rates and minimum error rates and only reduce power when it learns that it is sharing the medium with other networks, and (2) only those nodes that are causing interference with other networks are required to reduce power. RPC has the disadvantage that the network will only reduce interference with other networks capable of communicating with it and not with foreign devices, i.e., other technologies, such as CEBus, that are unable to communicate with it. HIPAR mode is used at the time of link setup. Once the link is established, a power reduction request may be accepted. the duration of the power reduction may be for a fixed length of time, or until link quality becomes unacceptably degraded.

Thus, a method for reducing interference and increasing effective capacity of a power line networking system has been disclosed. It will be appreciated that further variations and modifications thereof may be made within the scope of the invention as defined in the appended claims.

We claim:

1. A method of power control for use in a communications network having plural transceiver communications nodes therein, comprising:
   in an initiator node, transmitting a first signal at a first power level to a responder node;
   in the responder node, measuring and storing, a first signal level for the first signal and a first signal responder noise level; determining responder reception characteristic information; and sending a second signal to the initiator node;
   in the initiator node, measuring and storing, a second signal level and second signal initiator noise level; determining initiator reception characteristic information; and sending a third signal to the responder node;
   in both the initiator node and the responder node, determining a subsequent data transmit signal power and data rate; and
   transmitting data at the subsequent data transmit signal power and data rate, wherein power control is initiated by collision sense power control including initiating power control as a function of the number of collisions when plural nodes contend for a channel.

2. The method of claim 1 wherein said determining responder reception characteristic information and said determining initiator reception characteristic information include determining HIPAR transmit signal power; data transmit signal power; received HIPAR signal level; responder noise level; required responder HIPAR SNIR; and required responder data signal SNIR.

3. The method of claim 2 wherein said data transmit signal power is the exponentially weighted mean of the data transmit signal powers used in previous successful communications on the network.

4. The method of claim 1 wherein power control is initiated upon occurrence of an event taken from the group of events consisting of automatic power control, collision sense power control and requested power control.

5. The method of claim 1 wherein power control is initiated by automatic power control including invoking power control upon a link establishment of that link between at least two nodes on the network.

6. The method of claim 1 wherein power control is initiated by requesting power control including transmitting from a node at full power until a power control request is received from another node.

7. The method of claim 6 which includes a node polling other nodes for channel contention.

8. The method of claim 6 which includes a node transmitting a request to other nodes asking the other nodes to reduce power.

9. The method of claim 1 wherein said determining a subsequent data transmit signal power includes summing a required responder data signal SNIR, propagation loss and responder noise power, where propagation loss=(HIPAR transmit signal power−received HIPAR signal power).

10. The method of claim 1 which further includes storing network information, including storing data transmit signal power and HIPAR transmit signal power.

11. A method of power control for use in a communications network having plural transceiver communications nodes therein, comprising:
   storing, in each node, network information;
   in an initiator node, transmitting a training request command in a HIPAR mode to a responder node;
   in the responder node, measuring and storing, as network information, the HIPAR signal level and responder noise level of the training request command; determining responder reception characteristic information; and acknowledging the initiator's reception characteristic information;

in the initiator node, measuring and storing, as network information, the HIPAR signal level and initiator noise level of the responder reception characteristic information; determining initiator reception characteristic information; and sending a training request response having initiator reception characteristic information therein to the responder node;

in both the initiator node and the responder node, determining a subsequent data transmit signal power from the network information stored in the respective node; and transmitting data at the subsequent data transmit signal power.

12. The method of claim 11 wherein said determining responder reception characteristic information and said determining initiator reception characteristic information includes: HIPAR transmit signal power; data transmit signal power; received HIPAR signal level; responder noise level; required responder HIPAR SNIR; and required responder data signal SNIR.

13. The method of claim 12 wherein said data transmit signal power is the exponentially weighted mean of the data transmit signal powers used in previous successful communications on the network.

14. The method of claim 12 wherein power control adaptive, and is initiated upon occurrence of an event taken from the group of events consisting of automatic power control, collision sense power control and requested power control, and wherein automatic power control includes invoking power control upon a link establishment of that link between at least two nodes on the network; wherein collision sense power control includes initiating power control as a function of the number of collisions when plural nodes contend for a channel; wherein requested power control includes transmitting from a node at full power until a power control request is received from another node, which includes polling other nodes for channel contention and transmitting a request to other nodes asking the other nodes to reduce power.

15. The method of claim 11 wherein said determining a subsequent data transmit signal power from the network information includes summing a required responder data signal SNIR, propagation loss and responder noise power, where propagation loss=(HIPAR transmit signal power−received HIPAR signal power).

16. The method of claim 11 wherein said storing network information includes storing data transmit signal power and HIPAR transmit signal power.

17. A method of power control for use in a non-dedicated, wired communications network having plural transceiver communications nodes therein, comprising:

storing, in each node, network information;

in an initiator node, transmitting a training request command in a HIPAR mode to a responder node;

in the responder node, measuring and storing, as network information, the HIPAR signal level and responder noise level of the training request command; determining responder reception characteristic information; and acknowledging the initiator's reception characteristic information;

in the initiator node, measuring and storing, as network information, the HIPAR signal level and initiator noise level of the responder reception characteristic information; determining initiator reception characteristic information; and sending a training request response having initiator reception characteristic information therein to the responder node;

in both the initiator node and the responder node, determining a subsequent data transmit signal power and data rate from the network information stored in the respective node;

initiating power control upon occurrence of an event taken from the group of events consisting of automatic power control, collision sense power control and requested power control; and transmitting data at the subsequent data transmit signal power and data rate.

18. The method of claim 17 wherein said determining responder reception characteristic information and said determining initiator reception characteristic information includes determining HIPAR transmit signal power; data transmit signal power; received HIPAR signal level; responder noise level; required responder HIPAR SNIR; and required responder data signal SNIR.

19. The method of claim 18 wherein said data transmit signal power is the exponentially weighted mean of the data transmit signal powers used in previous successful communications on the network.

20. The method of claim 17 wherein automatic power control is initiated by invoking power control upon on a link establishment of that link between at least two nodes on the network.

21. The method of claim 17 wherein collision sense power control is initiated as a function of the number of collision when plural nodes contend for a channel.

22. The method of claim 17 wherein requested power control is initiated by transmitting from a node at full power until a power control request is received from another node.

23. The method of claim 22 which includes a node polling other nodes for channel contention.

24. The method of claim 22 which includes a node transmitting a request to other nodes asking the other nodes to reduce power.

25. The method of claim 17 wherein said determining a subsequent data transmit signal power from the network information includes summing a required responder data signal SNIR, propagation loss and responder noise power, where propagation loss=(HIPAR transmit signal power−received HIPAR signal power).

26. The method of claim 17 wherein said storing network information includes storing data transmit signal power and HIPAR transmit signal power.

* * * * *